(12) United States Patent
Kelly et al.

(10) Patent No.: US 11,308,584 B2
(45) Date of Patent: Apr. 19, 2022

(54) METHOD AND APPARATUS FOR DENOISING VIDEO CONTENT

(71) Applicant: Google LLC, Mountain View, CA (US)

(72) Inventors: Damien Kelly, San Francisco, CA (US); Neil Birkbeck, Santa Cruz, CA (US); Balineedu Adsumilli, Foster City, CA (US); Mohammad Izadi, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 136 days.

(21) Appl. No.: 16/613,932

(22) PCT Filed: Dec. 4, 2017

(86) PCT No.: PCT/US2017/064416
§ 371 (c)(1),
(2) Date: Nov. 15, 2019

(87) PCT Pub. No.: WO2019/112544
PCT Pub. Date: Jun. 13, 2019

(65) Prior Publication Data
US 2021/0241426 A1 Aug. 5, 2021

(51) Int. Cl.
*G06T 5/00* (2006.01)
(52) U.S. Cl.
CPC .... *G06T 5/002* (2013.01); *G06T 2207/10016* (2013.01); *G06T 2207/20021* (2013.01)

(58) Field of Classification Search
CPC .......... G06T 5/002; G06T 2207/10016; G06T 2207/20021; G06T 2207/20056; G06T 5/10
See application file for complete search history.

(56) References Cited

U.S. PATENT DOCUMENTS

2008/0085060 A1* 4/2008 Bosco ................... G06T 5/002
382/264
2014/0015921 A1 1/2014 Foi et al.
(Continued)

OTHER PUBLICATIONS

Brahim Alibouch et al., "An Adapted Block Thresholding Method for Omnidirectional Image Denoising", Research Journal of Applied Sciences, vol. 8, No. 18, Nov. 15, 2014, pp. 1966-1972.
(Continued)

*Primary Examiner* — Michael E Teitelbaum
(74) *Attorney, Agent, or Firm* — Young Basile Hanlon & MacFarlane, P.C.

(57) ABSTRACT

A method for denoising video content includes identifying a first frame block associated with a first frame of the video content. The method also includes estimating a first noise model that represents characteristics of the first frame block. The method also includes identifying at least one frame block adjacent to the first frame block. The method also includes generating a second noise model that represents characteristics of the at least one frame block adjacent to the first frame block by adjusting the first noise model based on at least one characteristic of the at least one frame block adjacent to the first frame block. The method also includes denoising the at least one frame block adjacent to the first frame block using the second noise model.

20 Claims, 5 Drawing Sheets

(56) References Cited

U.S. PATENT DOCUMENTS

2015/0187053 A1 7/2015 Chen et al.
2018/0302614 A1* 10/2018 Toksvig .................. G06T 19/00

OTHER PUBLICATIONS

De Simone et al., "Geometry-driven quantization for omnidirectional image coding", 2016 Picture Coding Symposium (PCS), IEEE, Dec. 4, 2016, pp. 1-5.
Yu et al., "Omnidirectional Video Coding Schemes", 2015 IEEE International Symposium on Mixed and Augmented Reality, IEEE, Sep. 29, 2015, pp. 31-36.
International Search Report and Written Opinion for International Application No. PCT/US2017/064416 dated May 9, 2018; 12 pgs.
Written Opinion of the IPEA for International Application No. PCT/US2017/064416 dated Nov. 11, 2019, 7 pgs.
Bosco A. et al., "Fast Method for Noise Level Estimation and Integrated Noise Reduction", IEEE Transactions on Consumer Electronics, Aug. 1, 2005, pp. 1028-1033.

* cited by examiner

METHOD AND APPARATUS FOR DENOISING VIDEO CONTENT

BACKGROUND

Digital media content, such as video content or video streams, may represent video using a sequence of frames or still images. Video streams can be used for various applications including, for example, video conferencing, high-definition video entertainment, video advertisements, or sharing of user-generated videos. A video stream can contain a large amount of data and consume a significant amount of computing or communications resources of a computing device for processing, transmission, or storage of the data. Various approaches have been proposed to reduce the amount of data in video streams, including denoising, compression, and other encoding techniques.

SUMMARY

This disclosure relates generally to denoising omnidirectional vides and rectified videos.

An aspect of the disclosed embodiments is a method for denoising video content includes identifying a first frame block associated with a first frame of the video content. The method also includes estimating a first noise model that represents characteristics of the first frame block. The method also includes identifying at least one frame block adjacent to the first frame block. The method also includes generating a second noise model that represents characteristics of the at least one frame block adjacent to the first frame block by adjusting the first noise model based on at least one characteristic of the at least one frame block adjacent to the first frame block. The method also includes denoising the at least one frame block adjacent to the first frame block using the second noise model.

An aspect of the disclosed embodiments is an apparatus for denoising video content includes a memory and a processor. The memory includes instructions executable by the processor to: identify a first frame block associated with a first frame of the video content; estimate a first noise model that represents characteristics of the first frame block; identify at least one frame block adjacent to the first frame block; generate a second noise model that represents characteristics of the at least one frame block adjacent to the first frame block by adjusting the first noise model based on at least one characteristic of the at least one frame block adjacent to the first frame block; and denoise the at least one frame block adjacent to the first frame block using the second noise model.

An aspect of the disclosed embodiments is an apparatus for denoising video content includes a memory and a processor. The memory includes instructions executable by the processor to: identify a first frame block associated with a first frame of the video content; estimate a first noise model that represents first noise power spectral density of the first frame block; identify at least one frame block adjacent to the first frame block; generate a second noise model that represents a second noise power spectral density of the at least one frame block adjacent to the first frame block by adjusting the first noise model based an estimated spatial variance between the first noise power spectral density and the second noise power spectral density; and denoise the at least one frame block adjacent to the first frame block using the second noise model.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
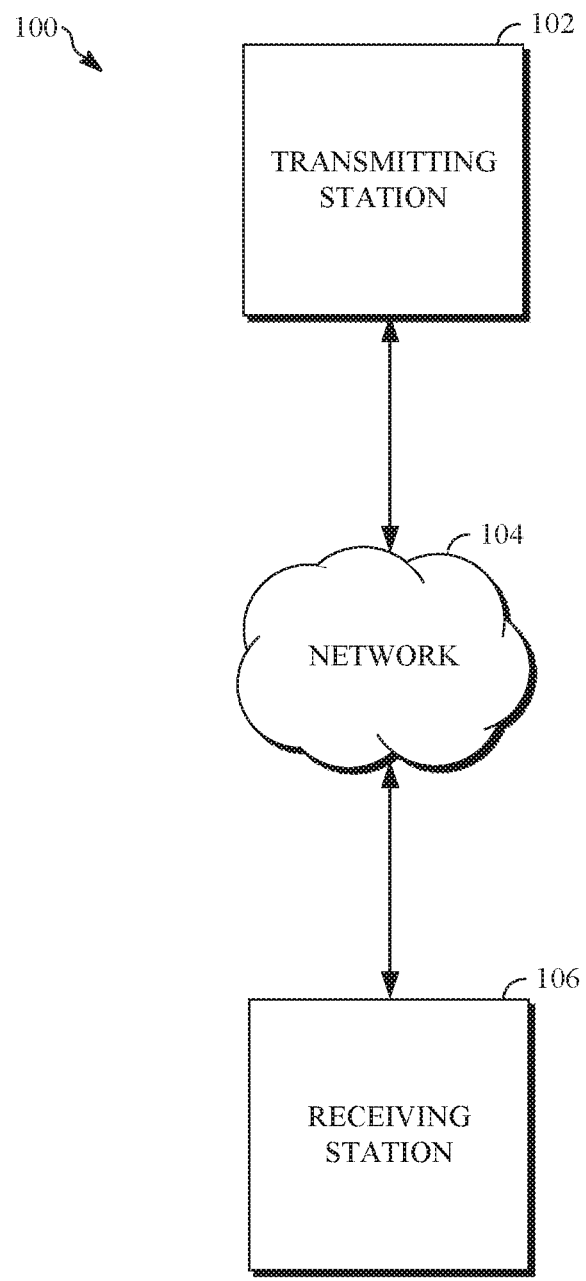
FIG. 1 is a schematic of a video encoding and decoding system.

Media content, such as video content, which is streamed or shared on social media platforms, are often corrupted by noise. The noise may not be perceptible by a consumer of the media content, however characteristics of the noise may negatively affect media content processing, such as video compression and/or video coding. For example, a video may have to be compressed or encoded at a relatively high bitrate in order to preserve the quality of the original noisy video (e.g., to accommodate the noise and preserve the perceptible quality of the original video). Encoding the media content at relatively high bitrates may result in large files, which, may increase storage and network costs associated with storing encoded media content, communicating encoded media content over a network, streaming encoded media content, or a combination thereof.

Accordingly, it may be advantageous to compress or encode the media content at a relatively low bitrate (e.g., resulting in a small data file for storage and/or network streaming) in order to limit storage costs, communication costs, network costs, or other costs associated with the encoded media content. However, when media content, such as video content, is compressed at a relatively low bitrate, the noise in the original video may interact with the video encoder causing perceptually disturbing artifacts in the encoded video. Accordingly, denoising video content (e.g., removing noise) prior to the video content being encoded may result in a better perceptual quality of the video content when the video content is encoded at a relatively low bitrate.

In some embodiments, the media content may include a spherical video which may comprise virtual reality (VR) videos, 360-degree videos, 3-dimensional videos, or omnidirectional videos. Spherical videos typically are comprised of a plurality of 2-dimensional images and/or videos captured by one or more capture devices, such as cameras or other suitable image and/or video capture devices. The 2-dimensional videos are then stitched together to into a single continuous spherical video that represents a sphere or a partial sphere around the one or more cameras. In some embodiments, a 2-dimensional planar map projection (or parameterization) of the sphere is used to represent the spherical video.

The planar map projection may include an equirectangular map projection, a cube map projection, or other suitable planar map projection. The planar map projection typically includes at least some stretching in various regions of the 2-dimensional images and/or videos, which may result in spatially varying noise across the various regions of the spherical video. Additionally, or alternatively, the spherical video is often stitched 2-dimensional images and/or videos captured and/or record by multiple different source cameras. Sensor characteristics associated sensors of each respective camera used to capture and/or record the 2-dimensional images and/or videos may contribute to noise in the 2-dimensional images and/or videos, which may contribute to noise in the spherical video.

Typically, noise in the 2-dimensional images and/or videos related to the sensor characteristics of the cameras used to capture and/or record the 2-dimensional images and/or videos is removed (e.g., denoised) in before the 2-dimensional images and/or videos are stitched together to form the spherical video (e.g., in the sensor domain) where the noise characteristics of the 2-dimensional image and/or videos are not spatially varying for each frame of each respective 2-dimensional image and/or video. However, videos shared on a social medial platform are typically communicated to the social medial platform after the 2-dimensional images and/or videos have been stitched together as spherical videos (e.g., in the panoramic domain) using a map projection, as described above. The noise characteristics of the spherical videos are spatially varying across the various regions of the respective spherical videos. For example, the noise characteristics of a spherical video may be distorted in a spatially varying way as a result of a camera geometry of the cameras used to capture and/or record the 2-dimensional images and/or videos that are stitched together to form the spherical video and/or the map projection used to represent the sphere of the spherical video, as described above.

The camera geometry of the cameras used to capture and/or record the 2-dimensional images and/or videos refers to a physical and/or logical arrangement of the cameras when the cameras captured and/or recorded the 2-dimensional images and/or videos. The camera geometry of the cameras used to capture and/or record the 2-dimensional images and/or videos and/or the map projection may be useful in identifying and/or removing (e.g., denoising) the noise characteristics of the spherical video.

However, the camera geometry and/or the map projection of a spherical video may be unknown once the 2-dimensional images and/or videos are stitched together to form the spherical video. Accordingly, systems and methods, according to the principles of the present disclosure, may model noise characteristics of a spherical video that are spatially varying in order to identify and/or remove (e.g., denoise) noise from the spherical video.

In some embodiments, a spherical video may be denoised by identifying flat frame blocks associated the spherical video. A noise model that represents noise characteristics of the respective flat frame blocks may be estimated. The noise model may be used to denoise other frame blocks associated with the spherical video. For example, frame block adjacent to the respective flat frame blocks of the spherical video may be identified. A noise model that represents noise characteristics of the frame blocks adjacent to the respective flat frame blocks is generated. The spherical video is denoised using the noise models that represent noise characteristics of the respective flat frame blocks and the noise models that represent noise characteristics of the frame blocks adjacent to the flat frame blocks.

In some embodiments, the denoised spherical video may be encoded, according to video coding scheme, at a suitable bitrate for storage of the spherical video in a storage medium and/or communication of the spherical video over a network. The spherical video may then be decoded, according to the video coding scheme, by a client computing device, such as a mobile phone, a tablet computer, a laptop computer, a notebook computer, a desktop computer, or other suitable computing device, capable of streaming, displaying, and/or playing back the spherical video.

In some embodiments, video coding may include breaking images associated with the spherical video into blocks and generating a digital video output bitstream (i.e., an encoded bitstream) using one or more techniques to limit the information included in the output bitstream. A received bitstream (e.g., received by a client device) can be decoded to re-create the blocks and the source images from the limited information. Encoding a spherical video, or a portion thereof, such as a frame or a block, can include using temporal or spatial similarities in the spherical video to improve coding efficiency. For example, a current block of a spherical video may be encoded based on identifying a difference (residual) between the previously coded pixel values, or between a combination of previously coded pixel values, and those in the current block.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of a video stream, such as a video stream of a spherical video or other suitable video content. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
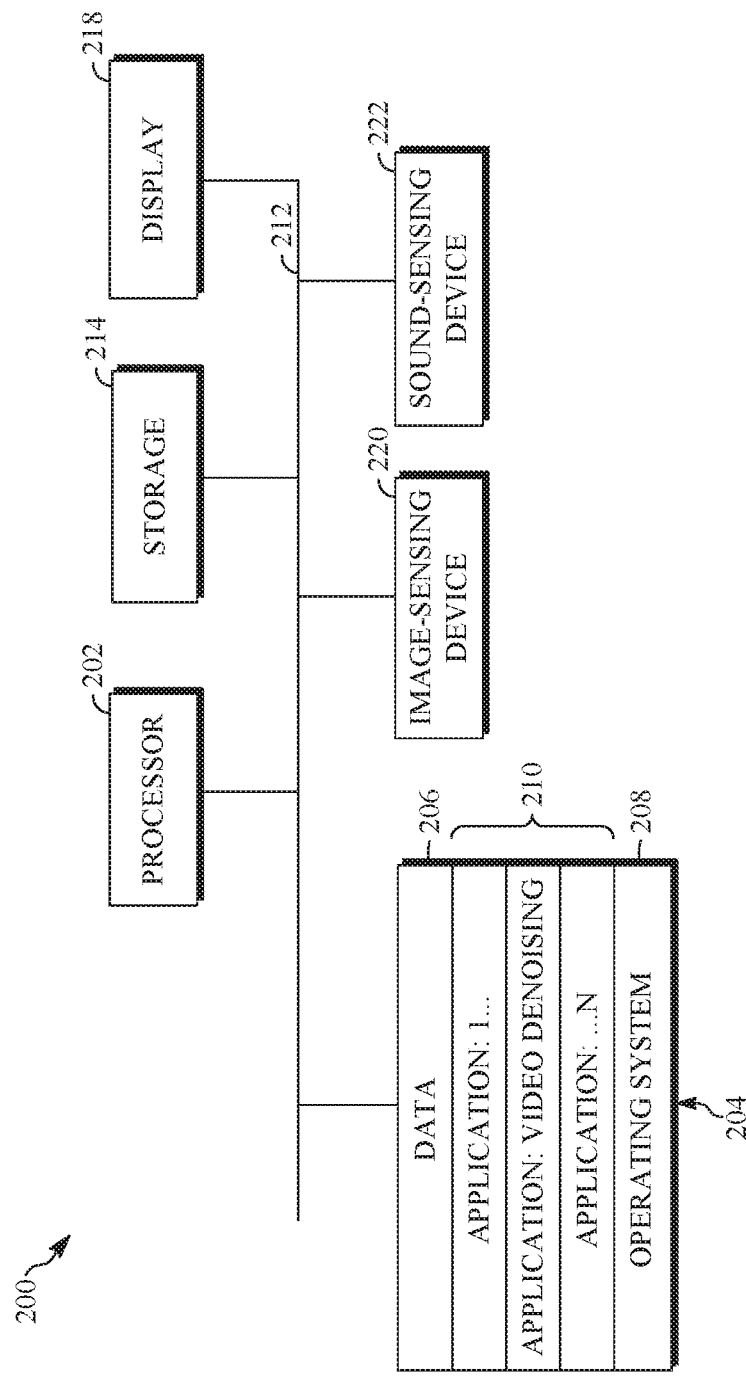
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, a server computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application and/or a video denoising application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
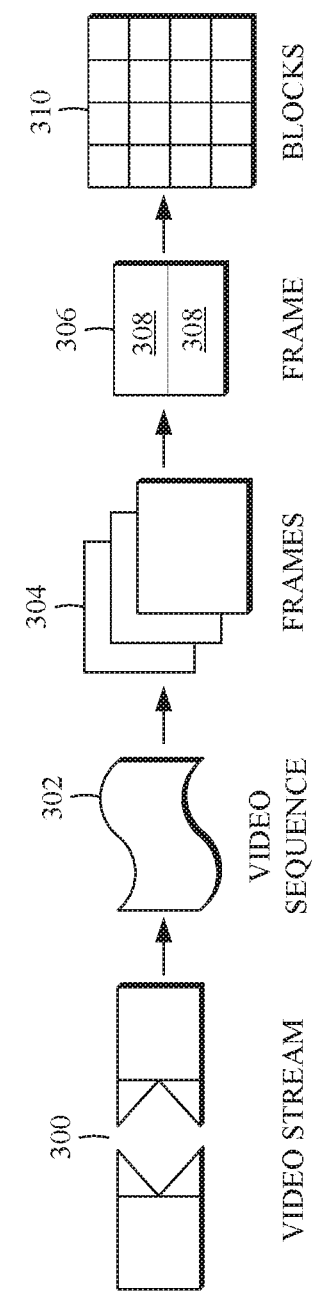
FIG. 3 is a diagram of a typical video stream to be encoded and subsequently decoded.

FIG. 3 is a diagram of an example of a video stream 300 to be encoded and subsequently decoded. The video stream 300 may include media content, as described above, such as spherical video stream. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into frame blocks 310, which can contain data corresponding to, for example, 16×16 pixels in the frame 306. The frame blocks 310 can also be arranged to include data from one or more segments 308 of pixel data. The frame blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
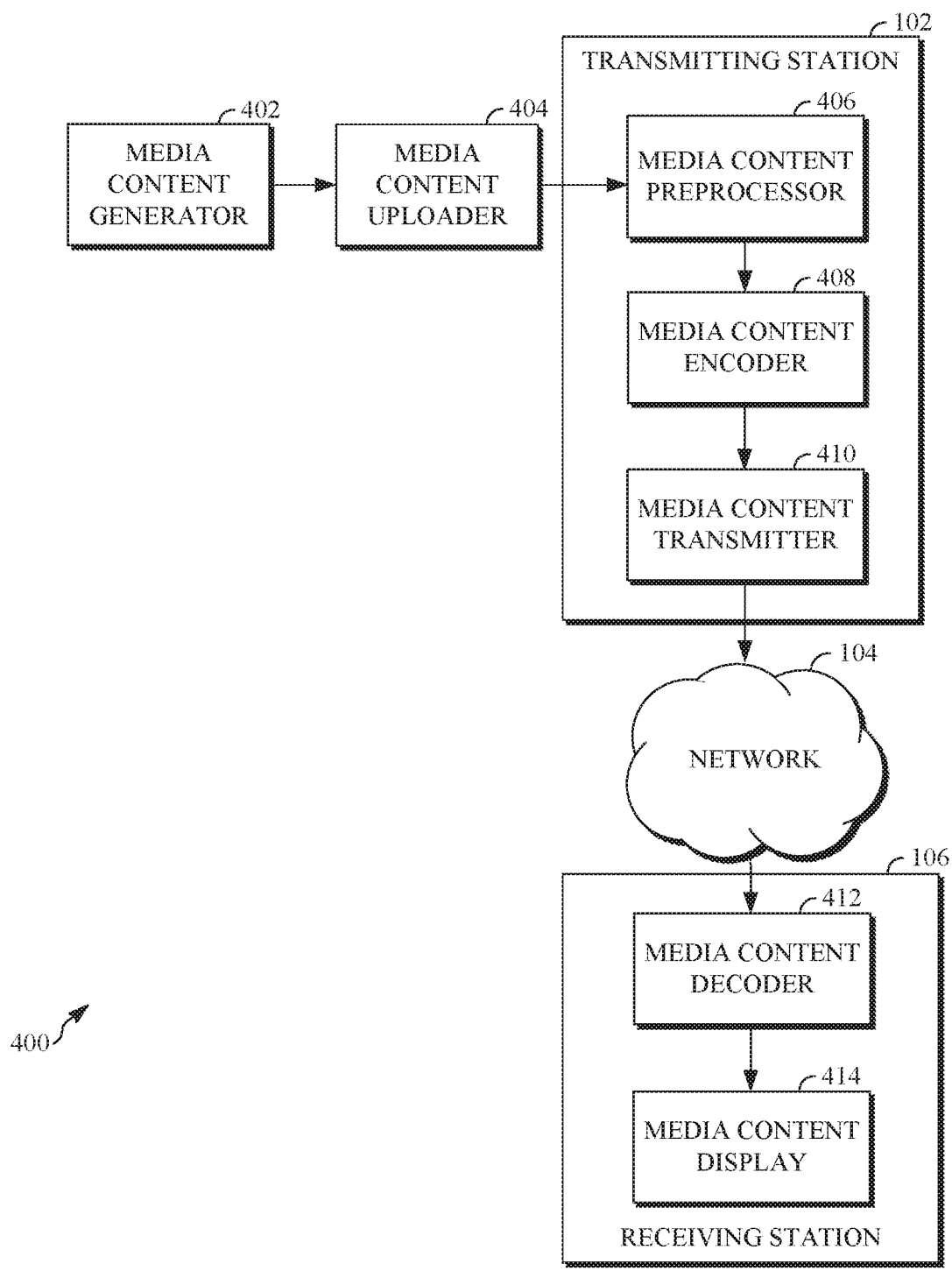
FIG. 4 is a block diagram of an example of a media content streaming system.

FIG. 4 is a block diagram of an example of a media content streaming system 400. The media content streaming system 400 may be configured to stream media content, such as spherical videos or other suitable video content, to a display. The media content streaming system 400 includes a media content generator 402, a media content uploader 404, a transmitting station, such as the transmitting station 102, described above, a network, such as the network 104, described above, and a receiving station, such as the receiving station 106, described above.

The transmitting station 102 includes a media content preprocessor 406, a media content encoder 408, and a media content transmitter 410. The receiving station 106 includes a media content decoder 412 and a media content display 414. The display 414 may include features similar to those of the display 218 of the computing device 200, described above. In some embodiments, the media content streaming system 400 may include fewer, additional, and/or different components than those described herein.

The media content generator 402 generates media content, such as, video content, audio content, photographic images, or other suitable media content. The media content generator 402 may include one or more video capture devices, such as video camera. The one or more video capture devices may be standalone video capture devices or associated with a computing device, such as the computing device 200, described above. In some embodiments, the media content generator 402 may be include one or more software applications configured to generate media content, such as spherical video content, as described above, or other suitable media content. For example, the media content generator 402 may capture a plurality of 2-dimensional images and/or videos using one or more image or video capture devices (e.g., cameras, as described). The media content generator 402 may then stitch the 2-dimensional images and/or video into a spherical video using a camera geometry associated with image or video capture devices and/or a map projection, as described above.

The media content uploader 404 is configured to upload media content generated by the media content generator 402 to the transmitting station 102. The media content uploader 404 may include any suitable media content uploader, such as a software application running on a computing device, such as the computing device 200, described above. The media content preprocessor 406 is configured to receive the uploaded media content and to perform preprocessing on the media content. For example, the media content preprocessor 406 may denoise media content, such as a spherical video, as will be described in detail.

The media content encoder 408 is configured to encode the media content according to a media content coding scheme. The media content encoder 408 may include a video encoder configured to encode the media content at a bitrate suitable for storing the encoded media content in a storage medium associated with the media content streaming system 400 and/or to transmit or communicate the encoded media content over a network to, for example, the receiving station 106. The media content encoder 408 may be configured to encode media content, as described above.

The media content transmitter 410 is configured to transmit or communicate the encoded media content over the network 104. For example, the media content transmitter 410 may transmit the encoded media content to the receiving station 106 via the network 104. The media content transmitter 410 may transmit or communicate the encoded media content using any suitable transmission or communications protocol.

The receiving station 106 is configured to receive the encoded media content, as described above. The media content decoder 412 is configured to decode the encoded media content according to the media content coding scheme used to encode the encoded media content, as described above. The media content display 414 may include any suitable display, such as the display 218 of the computing device 200, as described above. The media content display 414 is configured to display the decoded media content, for example, for viewing by a consumer of the media content using a media content viewing application (e.g., a media content viewing application installed on the computing device 200, a web-based media content viewing application, or other suitable media content viewing application).

Figure 5:
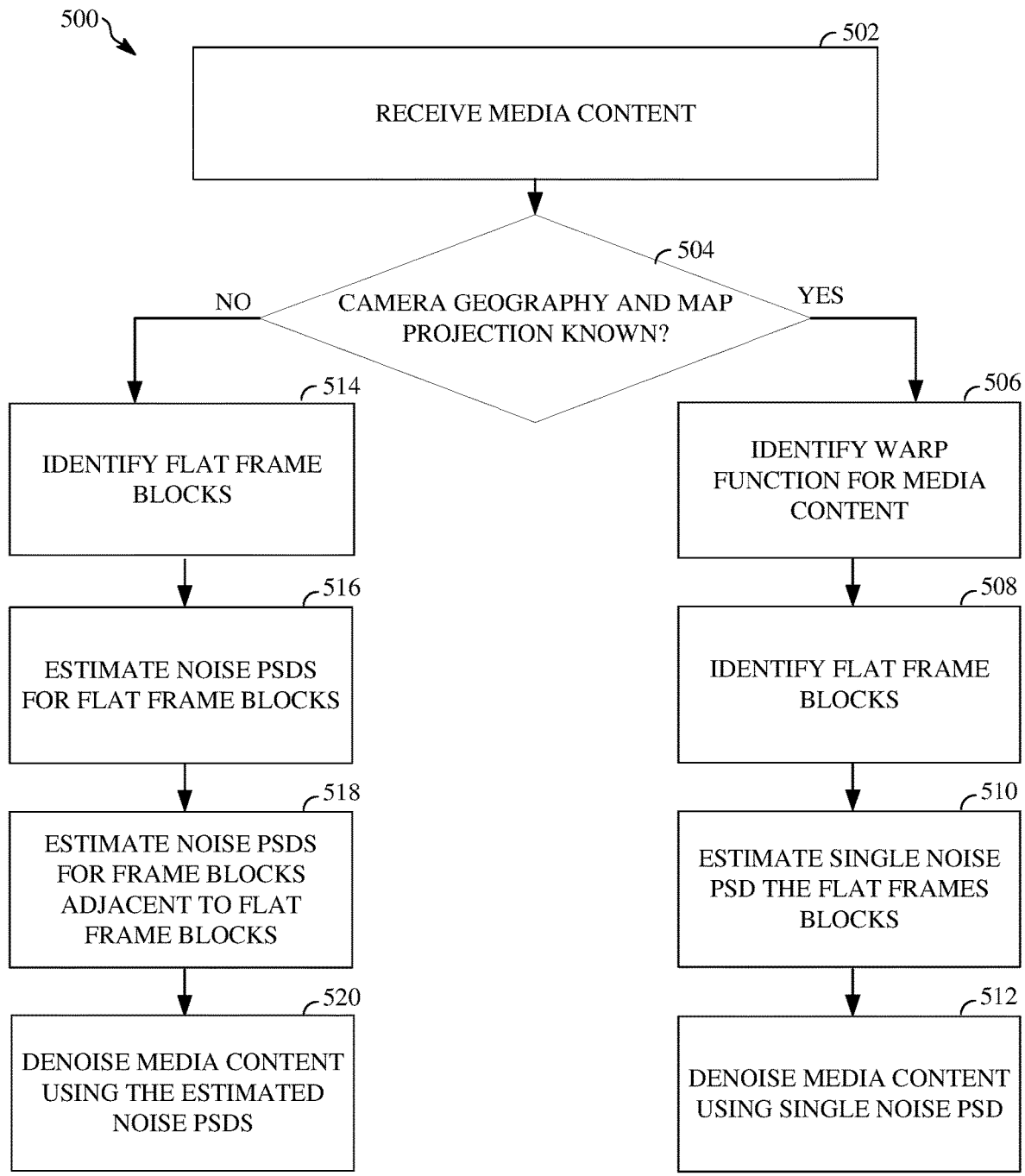
FIG. 5 is a flowchart diagram of a process for denoising media content according to an implementation of this disclosure.

FIG. 5 is a flowchart diagram of a process 500 denoising media content according to an implementation of this disclosure. The process 500 determines whether a camera geometry and/or a map projection associated with media content, such as a spherical video, is known. The process 500 estimates power spectral densities (PSD) for frame blocks associated with the spherical video. The PSDs represent spatially varying noise characteristics of the spherical video. The process 500 denoises the spherical video using the estimated noise PSDs, the camera geometry, the map projection, or a combination thereof.

The process 500 can be implemented, for example, as a software program that may be executed by computing devices such as transmitting station 102. For example, the software program can include machine-readable instructions that may be stored in a memory such as the memory 204 or the secondary storage 214, and that, when executed by a processor, such as CPU 202, may cause the computing device to perform the process 500. The process 500 can be implemented using specialized hardware or firmware. As explained above, some computing devices may have multiple memories or processors, and the operations described in the process 500 can be distributed using multiple processors, memories, or both.

At 502, the process 500 receives media content, as described above. The media content may include video content, audio content, photographic images, or other suitable media content. For example, the media content may include a spherical video, as described above. The spherical video may comprise a VR video, a 360-degree video, a 3-dimensional video, an omnidirectional video, or other suitable spherical video. The spherical video may include a plurality of 2-dimensional images and/or videos stitched together according to a camera geometry associated with video capture devices used to capture the plurality of 2-dimensional images and/or videos and/or a map projection, as described above.

At 504, the process 500 determines whether the camera geometry and of the video capture devices used to capture the 2-dimensional images and/or video and the map projection used to stitch the 2-dimensional images and/or videos into the spherical video are known. For example, the spherical video may include information embedded in the spherical video that indicates a camera geometry and the map projection, or the camera geometry and the map projection may be discoverable based on, for example, the source of the spherical video. If the camera geometry and the map projection are known, the process 500 continues at 506. If the camera geometry and the map projection are unknown, the process 500 continues at 514.

At 506, the process 500 identifies a warp function associated with the spherical video using the camera geometry and the map projection. For example, the warp function may be identifiable or determinable using the camera geometry and/or the map projection. The warp function $f$ represents distortion or warping in the spherical video as a result of stitching the 2-dimensional images and/or video according to the map projection to form the spherical video. The warp function may be represented as:

$$f = R^2 \rightarrow R^2$$

Assuming that an input image I (e.g., an image or frame associated with the spherical video) is distorted from an original image O (e.g., one of the plurality of 2-dimensional images used to form the spherical video) according to the warping function, the relationship between the input image I and the original image O can be shown as:

$$I(x,y) = O(f(x,y))$$

At 508, the process 500 identifies flat frame blocks associated with the spherical video. For example, as described above, the spherical video may be divided into frames. The frames are then subdivided into half overlapping, frame blocks of equal size, such as size n×n. The process 500 may then identify flat frame blocks in the 2-dimensional images and/or videos used to form the spherical video using the relationship between I and O, above. For example, the warp function can be used to convert frames of the spherical video back to frames of the original 2-dimensional images and/or video used to form the spherical video. The process 500 can then identify frame blocks that are homogenous or have no spatial texture within the frame block (e.g., flat frame blocks). It should be understood that the process 500 may identify flat frame blocks using any suitable method.

At 510, the process 500 estimates a noise PSD for flat frame blocks. For example, for each flat frame block identified, the process 500 uses a 3-dimensional fast Fourier transform on each respective flat frame block to estimate a noise PSD for each respective flat frame block. A noise PSD for a flat frame block represents noise characteristics of the flat frame block. The noise characteristics of a flat frame block may correspond to energy of noise at different frequencies. A single noise PSD is then estimated for a frame of the 2-dimensional images and/or videos used to form the spherical video by determining an average of the estimated noise PSDs associated with flat frame blocks of the frame.

At 512, the process 500 denoises the media content using the single noise PSD. For example, the process 500 identifies frame blocks in the frames of the spherical video (e.g., input images I) that correspond to frame blocks in the frames of the 2-dimensional images and/or videos used to form the spherical video (e.g., original images O). The process 500 may then use the single noise PSD and the warp function to estimate a noise PSD for a corresponding frame of the spherical video. For example, the single noise PSD is warped through the warp function in order to estimate a noise PSD for the corresponding frame of the spherical video. The process 500 then denoises the corresponding frame using the estimated noise PSD for the corresponding frame. For example, the process 500 inputs the estimated noise PSD into a 3-dimensional fast Fourier transform Wiener filter in order to denoise the corresponding frame. The process 500 continues to denoise each frame of the spherical video.

Typically, the camera geometry and the map projection are unknown to the process 500. When the camera geometry and the map projection are unknown, the process 500 continues at 514. At 514, the process 500 identifies flat frame blocks, as described above, in the frames of the spherical video. At 516, the process 500 estimates noise PSDs for each respective flat frame block of the spherical video, as described above. For example, the process 500 estimates a first noise PSD for a first flat frame block of a corresponding first frame.

As described above, the noise characteristics of the spherical video are spatially varying. That is, noise characteristics associated with a flat frame block may vary spatially from noise characteristics of frame blocks that are not homogeneous or have spatial texture within the frame blocks. Accordingly, the process 500 may regularize the noise characteristics in order to account for variations among the noise characteristics of each frame of the spherical video. For example, at 518, the process 500 estimates noise PSDs for frame blocks adjacent to identified flat frame blocks.

In some embodiments, in order to accurately estimate a noise PSD ($P_{r,s}(u,v)$, where u,v indicates a block indices and where r,s represents a particular frequency of a respective frame block) for frame blocks that are adjacent to flat frame block within the spherical video, the PDSs for the adjacent frame blocks are constrained by estimated noise PSDs ($E_{r,s}(u,v)$) for flat frame blocks may. This may be represented by the function:

$$P_{r,s}^* = \mathrm{argmin}_{P_{r,s}} \int_u \int_v \alpha_{u,v} [P_{r,s}(u,v) - E_{r,s}(u,v)]^2 + \psi(|\nabla P_{r,s}(u,v)|^2) du dv \quad (3)$$

Where $\alpha_{u,v}$ is a variable that is equal to 1 for flat frame blocks and where $\psi$ is a robust norm (e.g., $\psi(x)^2 = \sqrt{x^2 + \epsilon}$). That is, the process 500 estimates a particular frequency of an estimate PSD for a frame block that is adjacent to a flat frame block to be similar to a corresponding frequency of the estimated noise PSD for a corresponding flat frame block. The process 500 sets the estimated particular frequency of the estimated noise PSD for the frame block adjacent a respective flat frame block by adjusting a value of the corresponding particular frequency of the estimated noise PSD for the respective flat frame block. For example, the process 500 may increase or decrease a value of the corresponding particular frequency of the of the estimated noise PSD for the respective flat frame block and set the estimated particular frequency of the estimated noise PSD of the frame block adjacent to the respective flat frame block to the increased or decreased value. In some embodiments, the process 500 may determine whether to increase or decrease the value of the particular frequency of the estimated noise PSD of the flat frame block based on a spatial variance (e.g., a relative position) between the flat frame block and the frame block adjacent to the flat frame block.

The process 500, using the function above, estimates PSDs for frame blocks that are adjacent to flat frame blocks by for the entire spherical video. At 522, the process 500 denoises the media content (e.g., the spherical video) using the estimated noise PSDs for each respective flat frame block and the estimated noise PSDs for each respective frame block adjacent to the respective flat frame blocks. For example, the process 500 inputs an estimated noise PSD corresponding to a respective frame block into a 3-dimensional fast Fourier transform Wiener filter, as described above, in order to denoise the corresponding frame block. The process 500 continues to denoise each frame block each respective frame of the spherical video.

In some embodiments, at 518, the process 500 estimates a single common noise PSD that represents noise characteristics for frame blocks of a frame of the spherical video by regularizing a parametric representation of an estimated warp function $f$. The estimated warp function $f$ may represent an estimated common warp function that represents an estimated distortion between the frames of the spherical video and the frames of the 2-dimensional images and/or videos used to form the spherical video. The estimated warp function $f$ may be estimated using an affine transformation or other suitable transformation.

The process 500 assumes the 2-dimensional images and/or videos used to form the spherical video were warped according to the estimated warp function $f$ when the 2-dimensional images and/or videos were stitched. The process 500 may then estimate a single common noise PSD using a 3-dimensional fast Fourier transform on the frame blocks of a respective frame, as described above. The process 500 may then apply the estimated warp function $f$ to the single common noise PSD, as described above, which may result in a warped noise PSD that represents an estimate of the spatial varying noise characteristics of the spherical video. At 522, the process 500 denoises the media content (e.g., the spherical video) using the warped noise PSD. For example, the process 500 inputs the warped noise PSD into a 3-dimensional fast Fourier transform Wiener filter, as described above, in order to denoise the spherical video.

In some embodiments, the same image or video capture devices (e.g., cameras) may be used to generate a plurality of spherical videos that are then uploaded and received by the transmitting station 102, as described above. Noise characteristics of 2-dimensional images and/or videos captured by the video capture devices correspond to noise generated by sensors associated with the video capture devices. The process 500 may identify multiple spherical videos generated by the same image or video capture devices. The process 500 may then identify flat frame blocks, as described above, from each corresponding spherical video of the multiple spherical videos. The process 500 may estimate noise PSDs for each of the identified flat frame blocks, as described above. The process 500 may identify common noise characteristics using the estimated noise PSDs for each of the identified flat frame blocks. The process 500 may use the common noise characteristics and the estimated noise PSDs for each of the identified flat frame blocks of each of the multiple spherical videos to estimate PSDs for frame blocks in a respective one of the multiple spherical videos.

In some embodiments, the media content transmitter 410 may transmit or communicate an encoded spherical video and an estimated noise PSD corresponding to noise characteristics removed (e.g., denoised) from the encoded spherical video to the receiving station 106. The media content decoder 412 may decode the encoded spherical video, as described above. The receiving station 106 may be configured to add the noise characteristics removed (e.g., denoised) from the spherical video back to the spherical video using the estimated noise PSD. For example, a spherical video may include a presentation aesthetic that relies on the noise characteristics for visual effect.

In some embodiments, a method for denoising video content may include identifying a first frame block associated with a first frame of the video content. The method may further include estimating a first noise model that represents characteristics of the first frame block. The method may also include identifying at least one frame block adjacent to the first frame block. The method may also include generating a second noise model that represents characteristics of the at least one frame block adjacent to the first frame block by adjusting the first noise model based on at least one characteristic of the at least one frame block adjacent to the first frame block. The method may also include denoising the at least one frame block adjacent to the first frame block using the second noise model.

The video content may include an omnidirectional video, a 3-dimensional video, or a virtual reality video. In some embodiments, estimating the first noise model includes estimating the first noise model based on at least a camera geometry. In some embodiments the camera geometry is estimated based on one or more characteristics of the video content. In some embodiments, the characteristics of the first frame block include noise characteristics of the first frame block and the characteristics of the at least one frame block adjacent to the first frame block include noise characteristics of the at least one frame block adjacent to the first frame block.

In some embodiments, an apparatus for denoising video content includes a memory and a processor. The memory includes instructions executable by the processor to: identify a first frame block associated with a first frame of the video content; estimate a first noise model that represents characteristics of the first frame block; identify at least one frame block adjacent to the first frame block; generate a second noise model that represents characteristics of the at least one frame block adjacent to the first frame block by adjusting the first noise model based on at least one characteristic of the at least one frame block adjacent to the first frame block; and denoise the at least one frame block adjacent to the first frame block using the second noise model.

In some embodiments, an apparatus for denoising video content includes a memory and a processor. The memory includes instructions executable by the processor to: identify a first frame block associated with a first frame of the video content; estimate a first noise model that represents first noise power spectral density of the first frame block; identify at least one frame block adjacent to the first frame block; generate a second noise model that represents a second noise power spectral density of the at least one frame block adjacent to the first frame block by adjusting the first noise model based an estimated spatial variance between the first noise power spectral density and the second noise power spectral density; and denoise the at least one frame block adjacent to the first frame block using the second noise model.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for denoising video content, the method comprising:
    identifying a first frame block associated with a first frame of the video content, wherein the video content includes two-dimensional images obtained by one or more image capture devices that are stitched together into a spherical video using at least one of a camera geometry of the one or more image capture devices or a planar map projection that represents the spherical video;
    determining that the at least one of the camera geometry or the planar map projection is unknown; and
    after determining that the at least one of the camera geometry or the planar map projection is unknown:
        estimating a first noise model that represents characteristics of the first frame block;
        identifying at least one frame block adjacent to the first frame block;
        generating a second noise model that represents characteristics of the at least one frame block adjacent to the first frame block by adjusting the first noise model based on at least one characteristic of the at least one frame block adjacent to the first frame block; and
        denoising the at least one frame block adjacent to the first frame block using the second noise model.

2. The method of claim 1, wherein the camera geometry is estimated based on one or more characteristics of the video content, and estimating the first noise model includes estimating the first noise model based on at least the camera geometry.

3. The method of claim 1, wherein the characteristics of the first frame block include noise characteristics of the first frame block and the characteristics of the at least one frame block adjacent to the first frame block include noise characteristics of the at least one frame block adjacent to the first frame block.

4. An apparatus for denoising video content, the apparatus comprising:
    a processor configured to:
    identify a first frame block associated with a first frame of the video content, wherein the video content includes two-dimensional images obtained by one or more image capture devices that are stitched together into a spherical video using at least one of a camera geometry of the one or more image capture devices or a planar map projection that represents the spherical video;
    responsive to determining that the at least one of the camera geometry or the planar map projection is unknown:
        estimate a first noise model that represents characteristics of the first frame block;
        identify at least one frame block adjacent to the first frame block;
        generate a second noise model that represents characteristics of the at least one frame block adjacent to the first frame block by adjusting the first noise model based on at least one characteristic of the at least one frame block adjacent to the first frame block; and
        denoise the at least one frame block adjacent to the first frame block using the second noise model; and
    responsive to determining that the at least one of the camera geometry or the planar map projection is known:
        convert an image of a frame of the spherical video to an original image of the two-dimensional images using a distortion or warping in the spherical video resulting from stitching together the two-dimensional images using the at least one of the camera geometry or the planar map projection;
        identify flat frame blocks of the original image, wherein the flat frame blocks are homogenous or have no spatial texture;
        estimate a single noise level using noise characteristics of the flat frame blocks;
        estimate noise for the image of the frame of the spherical video using the distortion or warping in the spherical video resulting from stitching together the two-dimensional images using the at least one of the camera geometry or the planar map projection; and
        denoise the frame of the spherical video using the estimated noise.

5. The apparatus of claim 4, wherein the video content includes an omnidirectional video, a virtual reality video, or a 3-dimensional video.

6. The apparatus of claim 4, wherein the camera geometry is estimated based on one or more characteristics of the video content.

7. The apparatus of claim 4, wherein the characteristics of the first frame block include noise characteristics of the first frame block and the characteristics of the at least one frame block adjacent to the first frame block include noise characteristics of the at least one frame block adjacent to the first frame block.

8. An apparatus for denoising video content, the apparatus comprising:
    a memory; and
    a processor, wherein the memory includes instructions executable by the processor to:
    identify a first frame block associated with a first frame of the video content;
    estimate a first noise model that represents first noise power spectral density of the first frame block;

identify at least one frame block adjacent to the first frame block;

generate a second noise model that represents a second noise power spectral density of the at least one frame block adjacent to the first frame block by adjusting the first noise model based an estimated spatial variance between the first noise power spectral density and the second noise power spectral density; and denoise the at least one frame block adjacent to the first frame block using the second noise model.

9. The apparatus of claim 8, wherein the video content includes an omnidirectional video.

10. The apparatus of claim 8, wherein the video content includes a 3-dimensional video.

11. The apparatus of claim 8, wherein the video content includes a virtual reality video.

12. The apparatus of claim 8, wherein the first noise model is estimated based on at least a camera geometry.

13. The apparatus of claim 8, wherein the first noise power spectral density represents noise characteristics of the first frame block and the second noise power spectral density represents noise characteristics of the at least one frame block adjacent to the first frame block.

14. The method of claim 1, wherein the first noise model includes a first noise power spectral density, and the second noise model includes a second noise power spectral density.

15. The method of claim 1, wherein:
the first noise model includes a first noise power spectral density,
the second noise model includes a second noise power spectral density, and
adjusting the noise model comprises adjusting the first noise model based an estimated spatial variance between the first noise power spectral density and the second noise power spectral density.

16. The method of claim 1, wherein the first frame block is a flat frame block that is homogeneous or has no spatial texture.

17. The method of claim 1, wherein noise characteristics of the spherical video are spatially varying.

18. The apparatus of claim 4, wherein the camera geometry comprises at least one of a physical arrangement or a logical arrangement of the one or more image capture devices when the two-dimensional images are obtained.

19. The apparatus of claim 4, wherein:
to estimate the first noise model comprises to estimate a first noise power spectral density,
to estimate the second noise model comprises to estimate a second noise power spectral density,
to adjust the noise model comprises adjusting the first noise model based an estimated spatial variance between the first noise power spectral density and the second noise power spectral density, and
to estimate a single noise level comprises to estimate a single noise power spectral density.

20. The apparatus of claim 4, wherein:
to denoise the frame comprises to input the estimated noise into a three-dimensional fast Fourier transform Wiener filter.

* * * * *